United States Patent
Fidrich et al.

(10) Patent No.: US 7,388,973 B2
(45) Date of Patent: Jun. 17, 2008

(54) SYSTEMS AND METHODS FOR SEGMENTING AN ORGAN IN A PLURALITY OF IMAGES

(75) Inventors: Márta Fidrich, Szeged (HU); Géza Makay, Szeged (HU); Eörs Máté, Szeged (HU); Emese Balogh, Satu Mare (RO); Attila Kuba, Szeged (HU); László G. Nyúl, Szeged (HU); Judit Kanyó, Kecskemét (HU)

(73) Assignee: General Electric Company, Schenectady, NY (US)

( * ) Notice: Subject to any disclaimer, the term of this patent is extended or adjusted under 35 U.S.C. 154(b) by 676 days.

(21) Appl. No.: 10/858,241

(22) Filed: Jun. 1, 2004

(65) Prior Publication Data

US 2005/0276455 A1    Dec. 15, 2005

(51) Int. Cl.
*G06K 9/00* (2006.01)

(52) U.S. Cl. ..................... 382/128; 382/285; 378/21

(58) Field of Classification Search ............... 382/128, 382/129, 130, 131, 132, 133, 154, 168, 181, 382/203, 217, 232, 255–256, 274, 276, 294, 382/100, 173, 190, 199, 285, 292, 305; 378/21, 378/4, 20

See application file for complete search history.

(56) References Cited

U.S. PATENT DOCUMENTS

| | | | |
|---|---|---|---|
| 5,859,891 A | | 1/1999 | Hibbard |
| 5,926,568 A * | 7/1999 | Chaney et al. | 382/217 |
| 6,249,594 B1 * | 6/2001 | Hibbard | 382/128 |
| 6,985,612 B2 * | 1/2006 | Hahn | 382/128 |
| 6,990,222 B2 * | 1/2006 | Arnold | 382/131 |
| 7,158,692 B2 * | 1/2007 | Chalana et al. | 382/294 |

FOREIGN PATENT DOCUMENTS

WO    WO01/78010 A2    10/2001

OTHER PUBLICATIONS

IEEE Transactions On Medical Imaging, vol. 21, No. 12, Dec. 2002, A Knowledge-Based Approach To Automatic Detection Of The Spinal Cord In CT Images, pp. 1504-1516.*

Computer Graphics, vol. 25, No. 4, Jul. 1991, Geometrically Deformed Models: A Method For Extracting Closed Geometric Models From Volume Data, pp. 217-226.

CG Topics Jan. 2002, A 3D Segmentation Method Of The Spinal Cord Applied On CT Data, pp. 28-29.

On Active Contour Models And Balloons, Laurent D. Cohen, INRIA, Domaine de Voluceau, Rocquencourt, B.P. 105, 78153 Le Chesnay Cedex, France, pp. 1-18.

(Continued)

*Primary Examiner*—Seyed Azarian
(74) *Attorney, Agent, or Firm*—Armstrong Teasdale LLP (57) ABSTRACT

A system for segmenting an organ in a plurality of images is described. The system includes an imaging system configured to generate a first set of slices showing images of a subject having the organ. The system also includes a controller configured to determine a second set of slices within the first set, where the second set of slices includes the organ and a remaining set of slices within the first set of slices excludes the organ. The controller is also configured to segment the organ from the second set of slices.

25 Claims, 7 Drawing Sheets

OTHER PUBLICATIONS

Finite Element Methods For Active Contour Models And Balloons For 2D And 3D Images, Laurent D. Cohen and Issac Cohen, CEREMADE, U.R.A. CNRS 749, Université Paris IX-Dauphine Place du Marechal de Lattre de Tassigny 75775 Paris Cedex 16, France, Inria, Domaine de Voluceau, Rocquencourt B.P. 105, 78153 Le Chesnay Cedex France.

* cited by examiner

SYSTEMS AND METHODS FOR SEGMENTING AN ORGAN IN A PLURALITY OF IMAGES

BACKGROUND OF THE INVENTION

This invention relates generally to imaging systems and more particularly to systems and methods for segmenting an organ in a plurality of images.

Several modalities are used to image a patient's internal anatomy or alternatively the patient's functionality. During clinical diagnosis, the images are obtained to determine how a disease has progressed. For example, the images help distinguish between infected tissues (such as a tumor mass, for example) and healthy tissues within the patient. As another example, the images may help distinguish between differences present within the healthy tissues.

The images are also useful for radiotherapy planning (RT) or alternatively for surgical planning. In the case of RT planning, computed tomography (CT) imaging is generally used because intensity values are a function of radiation dose calculation. A CT image is three dimensional (3D), and more precisely, it is a collection of adjacent transaxial two dimensional (2D) slices. Clinicians, such as radiologists, dosimetrists, and radiotherapists, recombine anatomical elements of 2D slices to form a 3D organ image that includes anatomical data about the patient.

RT planning typically involves tracing outlines of a few critical structures on a large number of images. Manually drawing the outlines on a contiguous set of 2D slices and combining the 2D slices can be time consuming and labor intensive. The time and labor increases significantly with the number of image slices, and the number and size of organs in an anatomical area of interest. The quality of the outlining and the resultant 3D organ image depend on the resolution and contrast of the 2D slices, and on the knowledge and judgment of the clinicians.

Some automated methods for segmenting the organ provide a solution that reduces the time and labor associated with manually segmenting the organ. For example, in one automated method, a region and an enclosing edge of a spinal canal are obtained by tracing a set of images. Once a portion of the region is obtained, pixels surrounding an edge of the portion are examined to determine whether the pixels should be included within the portion of the region. However, in automated methods, "leaking out", described below, occurs, where the organ leaks out of a boundary of the organ. For example, in the method where the pixels surrounding the edge are examined, leaking out occurs when a contour of the spinal canal cannot be identified in an image due to a partial volume averaging effect or alternatively due to an open vertebra.

BRIEF DESCRIPTION OF THE INVENTION

In one aspect, a system for segmenting an organ in a plurality of images is provided. The system includes an imaging system configured to generate a first set of slices showing images of a subject having the organ. The system also includes a controller configured to determine a second set of slices within the first set, where the second set of slices includes the organ and a remaining set of slices within the first set of slices excludes the organ. The controller is also configured to segment the organ from the second set of slices.

In yet another aspect, a system for segmenting at least one of a spinal cord and a spinal canal in images is provided. The system includes a computed tomography (CT) system configured to generate a first set of slices showing images of a subject having at least one of the spinal cord and the spinal canal. The system also includes a controller configured to determine a second set of slices within the first set, where the second set of slices includes at least one of the spinal cord and the spinal canal, and a remaining set of slices within the first set of slices excludes at least one of the spinal cord and the spinal canal. The controller is also configured to segment at least one of the spinal cord and the spinal canal from the second set of slices.

In another aspect, a computer-readable medium encoded with a program is provided. The program is configured to determine a second set of slices within a first set of slices showing images of a subject having an organ, where the second set of slices includes the organ of the subject, and a remaining set of slices within the first set of slices excludes the organ. The program is also configured to segment the organ from the second set of slices.

In yet another aspect, a controller is provided. The controller is configured to receive a seed point from a user for a first slice, and use the seed point to segment a region within a second slice.

In another aspect, a controller is provided. The controller is configured to display a plurality of slices to a user, and receive an indication of a slice in which a spinal cord is encapsulated by a vertebrae.

In yet another aspect, a method for segmenting an organ in a plurality of images is provided. The method includes obtaining a first set of slices showing images of a subject having the organ, determining a second set of slices within the first set, where the second set of slices includes the organ of the subject, and a remaining set of slices within the first set of slices excludes the organ. The method also includes segmenting the organ from the second set of slices.

In another aspect, a method for segmenting an organ in a plurality of images is provided. The method includes specifying a seed point within a first slice, and obtaining a region within a second slice by utilizing the seed point.

In yet another aspect, a method for segmenting an organ in a plurality of images is provided. The method includes viewing a plurality of slices, and providing an indication of a slice in which a spinal cord is encapsulated by a vertebrae.

In another aspect, a method for segmenting an organ in a plurality of images is provided. The method includes performing a segmentation using at least one of an angle force, a right distance force, a left distance force, an image force, a constraint force, and an inflation force.

In yet another aspect, a method for segmenting an organ in a plurality of images is provided. The method includes propagating a centroid of an enclosed region of a first slice to a second slice adjacent to the first slice, where the centroid is a seed point within the second slice.

In still another aspect, a method for segmenting an organ in a plurality of images is provided. The method included propagating a centroid of an enclosed region based on at least one of a size, shape, and a position of the organ from a first slice to at least one slice adjacent to the first slice.

In yet another aspect, a method for segmenting an organ in a plurality of images is provided. The method includes automatically stopping at one of a first body region of a subject and a second body region of the subject when segmenting the organ in images obtained by scanning the subject.

In another aspect, a method for segmenting an organ in a plurality of images is provided. The method includes performing a segmentation using a combination of at least two of a size, a shape and morphology constraints.

In yet another aspect, a system for segmenting an organ in a plurality of images is provided. The system is configured to map a first slice to one of remaining slices within a set, calculate a distance map from the first slice, weigh the distance map to generate a weighted distance map, add the weighted distance map to intensity values of the one of the remaining slices, and restart growth of a region within the one of the remaining slices.

DETAILED DESCRIPTION OF THE INVENTION

Figure 1:
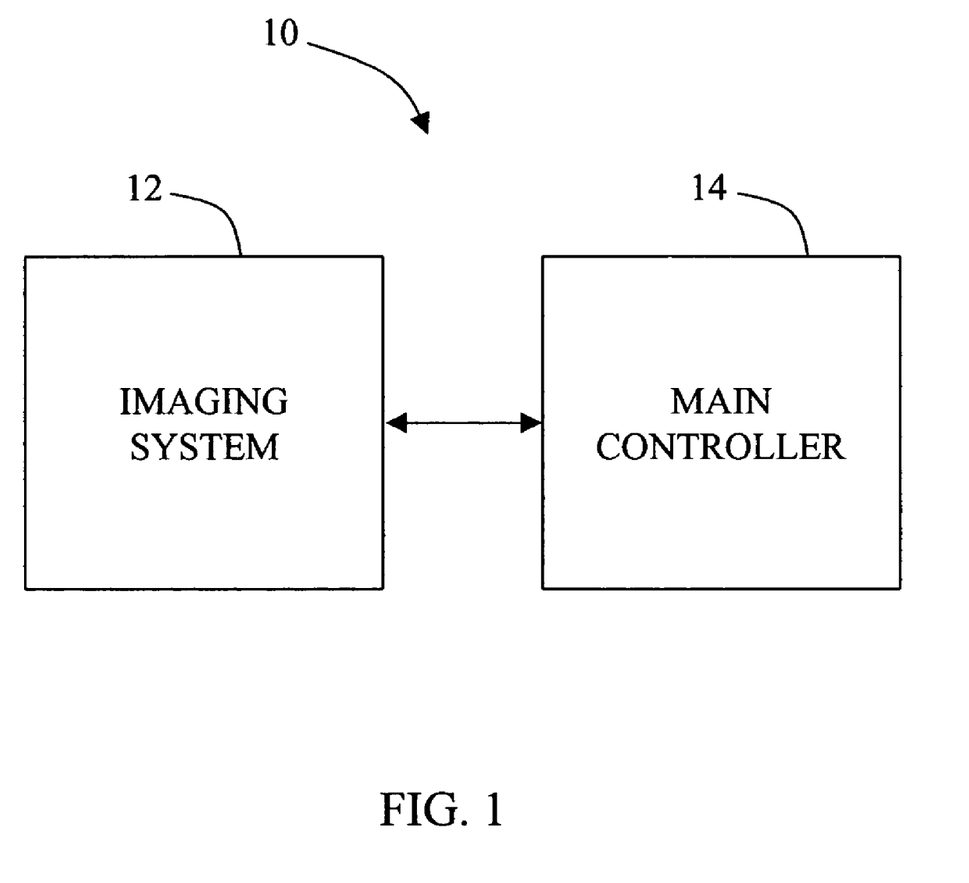
FIG. 1 is an embodiment of a system for segmenting an organ in a plurality of images.

FIG. 1 is an embodiment of a system 10 for segmenting an organ including an elongated and a tubular organ in a plurality of images. Examples of an elongated and tubular organ include a spinal cord and a spinal canal. In one embodiment, system 10 is a system for automatically segmenting the elongated and/or a tubular organ in a plurality of computed tomography images by using the presence of another structure in a nearby image. Examples of other structures include a collar bone, a pelvis bone, chest, breast, neck, head, and other organs. System 10 includes an imaging system 12 and a main controller 14. Examples of imaging system 12 include a camera, an X-ray plane film radiography system, a computed tomography (CT) imaging system, a magnetic resonance imaging (MRI) system, and a nuclear medicine imaging system. Examples of nuclear medicine imaging systems include a positron emission tomography (PET) system and a single photon emission computed tomography (SPECT) system. Imaging system 12 is used to acquire a first set of slices of images. Main controller 14 receives the first set of slices from imaging system 12 and executes a method for segmenting an organ in a plurality of images. In an alternative embodiment, main controller 14 is located within imaging system 12.

In one embodiment, main controller 14 includes a device (not shown), for example, a floppy disk drive, a CD-ROM drive, a DVD drive, a magnetic optical disk (MOD) device, or any other digital device including a network connecting device such as an Ethernet device for reading instructions and/or data from a computer-readable medium (not shown), such as a floppy disk, a CD-ROM, a DVD or an other digital source such as a network or the Internet, as well as yet to be developed digital means. In another embodiment, main controller 14 executes instructions stored in firmware (not shown). Main controller 14 is programmed to perform functions described herein, and as used herein, the term controller is not limited to just those integrated circuits referred to in the art as controllers, but broadly refers to controllers, computers, processors, microcontrollers, microcomputers, programmable logic controllers, application specific integrated circuits, and other programmable circuits, and these terms are used interchangeably herein.

In some known CT imaging system configurations, an x-ray source projects a fan-shaped beam which is collimated to lie within an X-Y plane of a Cartesian coordinate system and generally referred to as an "imaging plane". The x-ray beam passes through a subject, such as a patient, being imaged. The x-ray beam, after being attenuated by the subject, impinges upon an array of radiation detectors. The intensity of the attenuated radiation beam received at the detector array is dependent upon the attenuation of the x-ray beam by the subject. Each detector element of the detector array produces a separate electrical signal that is a measurement of the attenuation at a location of the detector elements. The attenuation measurements from all the detectors elements are acquired separately to produce a transmission profile.

A group, i.e., projection data, of attenuation measurements from the detector array at one gantry angle is referred to as a "view". A "scan" of the subject includes a set of views made at different gantry angles, or alternatively view angles, during one revolution of the x-ray source and the detector array. An example of a scan is a helical scan. In the helical scan, the subject is moved while the projection data for a prescribed number of slices is acquired. Another example of a scan is an axial scan which is scan of the subject around an axis that passes through the subject. In a scan, the projection data is processed to reconstruct an image that corresponds to a two dimensional (2D) slice taken through the subject. One method for reconstructing an image from a set of projection data is referred to in the art as the filtered back projection technique. This process converts the attenuation measurements from a scan into intensity values called "CT numbers" or alternatively called "Hounsfield units", which are used to control brightness of a corresponding pixel on a cathode ray tube display. The intensity values are integers.

As used herein, an element or step recited in the singular and preceded with the word "a" or "an" should be understood as not excluding plural said elements or steps, unless such exclusion is explicitly recited. Furthermore, references to "one embodiment" of the systems and methods for segmenting an organ in a plurality of images are not intended to be interpreted as excluding the existence of additional embodiments that also incorporate the recited features.

Also as used herein, the phrase "reconstructing an image" is not intended to exclude embodiments of the systems and methods for segmenting an organ in a plurality of images in which data representing an image is generated but a viewable image is not generated. However, many embodiments generate or alternatively are configured to generate at least one viewable image.

Figure 2:
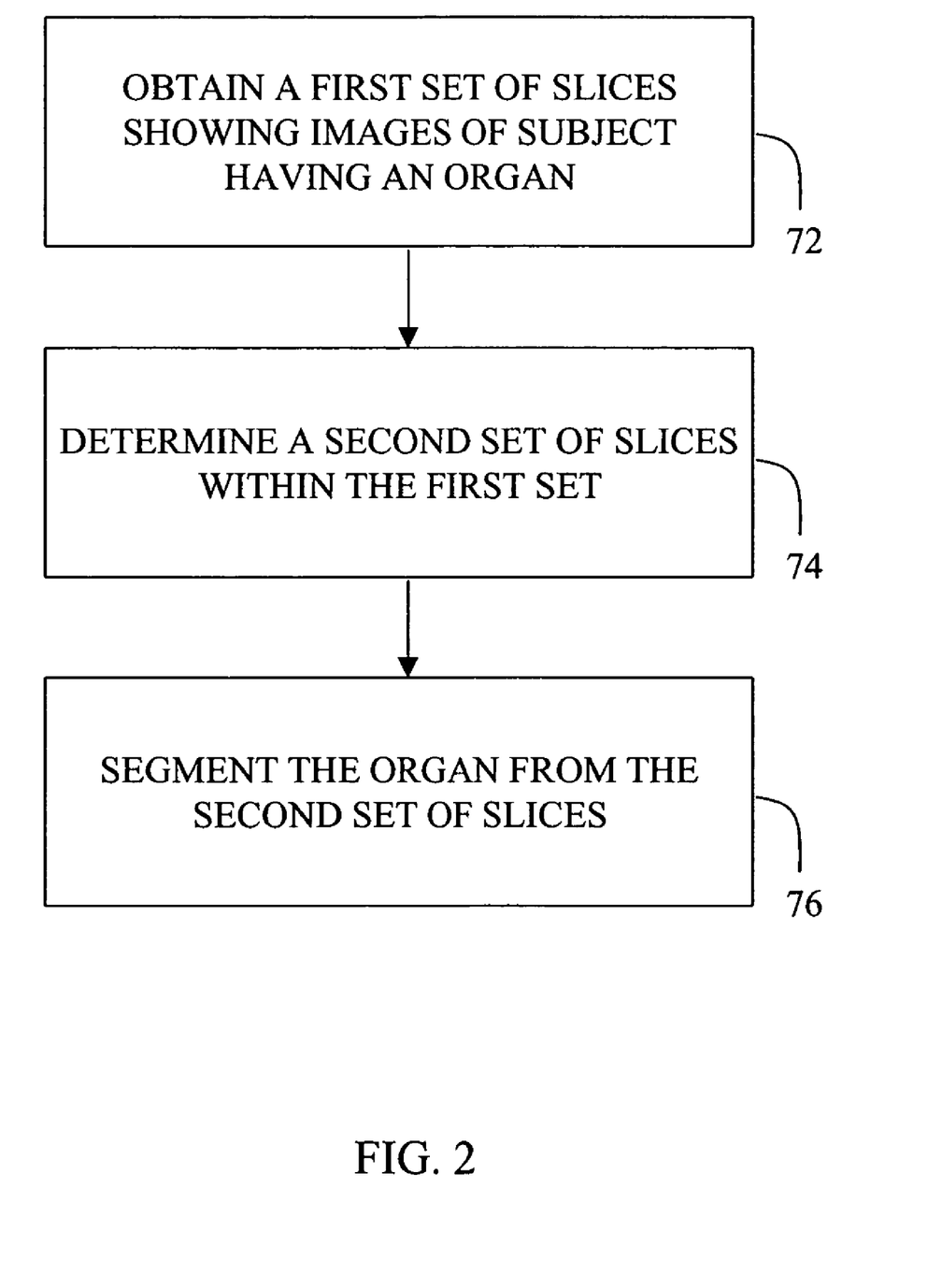
FIG. 2 is a flowchart of an embodiment of a method for segmenting an organ in a plurality of images.

FIG. 2 is a flowchart of an embodiment of a method for segmenting an organ in a plurality of images. The method includes obtaining 72 the first set of slices showing images of the subject having the organ. Imaging system 12 generates the first set of slices. Main controller 14 obtains 72 the first set of slices from imaging system 12 and determines 74 a second set of slices within the first set. The second set of slices includes the organ of the subject and a remaining set of slices within the first set of slices excludes the organ. Main controller 14 segments 76 the organ from the second set of slices by executing one of an active contour algorithm, described below, and a region growing algorithm, also described below.

To determine 74 the second set of slices that include the organ and to determine the remaining set of slices that exclude the organ, main controller 14 searches for an initial slice. The initial slice is a slice located at a first body region beyond which the organ is excluded from the first set of slices and the initial slice is located closer to the head of the subject than to the feet of the subject. As an example, the initial slice is located at a head region including the head of the subject. A user selects a seed point $S_1$ within the organ in one of the slices within the first set. Starting from the seed point $S_1$, main controller 14 computes factors in each slice within the first set of slices along a decreasing Y direction, which is a direction in which co-ordinates along a Y-axis decrease. Examples of the factors include a volume of a tissue, such as a bone tissue, an area occupied by the tissue, a form, such as a curvature, and a shape, of the organ. As an example, the shape is given as a sequence of concave and/or convex curvature regions of the organ. Main controller 14 determines a location of a major change in at least one of the factors of the tissue. As an example, the major change can be a major or a considerable decrease, a major or a considerable increase, a sequence of the major decrease and the major increase, and a sequence of the major increase and the major decrease. As an example, the major increase occurs at a level above a collar bone of the subject and the major decrease occurs a base of a skull of the subject. Main controller 14 determines an upper limit at which the initial slice is located. The upper limit is a level of the major change in at least one of the factors. As an example, the upper limit is a level where at least one of the factors of the tissue starts to increase considerably after the major decrease. Segmentation of the organ is not performed beyond the upper limit.

In one embodiment, main controller 14 computes a characteristic bone number that indicates an expected number of bony voxels on an average slice by counting a number of voxels including intensities of bone tissues in each image slice and by determining a mode of the intensities. Main controller 14 obtains a maximum number, such as 1.5 times of the characteristic bone number, obtains a minimum number, such as 0.8 times of the characteristic bone number. Main controller 14 determines that the major decrease is at a location of an image in which a number of voxels including intensities of bone tissues is equal to or alternatively below the minimum number, and determines that the major increase is at a location of an image in which a number of voxels including intensities of bone tissues is equal to or alternatively above the maximum number.

A rationale behind the above-described embodiments of determining the initial slice is explained as follows. There are situations when an upper end of the organ, such as an organ of interest or a target organ, is present along with the other structures in the first set of slices, and therefore a task is to separate the organ, such as the target organ, from the other structures. The initial slice is searched by using at least one of the factors as a guideline. For example, when one of the factors is a volume of bony structures, the upper limit is a level where a volume of bone tissues of the bony structures starts to increase considerably after the major decrease. In the example, the upper limit is determined based on knowledge that a collarbone slice of the subject has larger volumes of bone tissue as compared to a neck slice of the subject and skull and jaw slices of the subject have larger volumes of bone tissue as compared to that of a neck slice. Futhermore, in the example, the upper limit is determined based on knowledge that the spinal cord is present in the shoulder and neck region but is not present inside the skull and therefore an extent of the spinal cord is limited to a level below the skull.

To determine 74 the second set of slices that include the organ, such as the organ of interest, and to determine the remaining set of slices that exclude the organ, main controller 14 searches for a last slice located at a lower limit. As an example, the first and the last slices are obtained to segment an elongated organ, such as a spinal cord. The last slice is a slice located at a second body region beyond which the organ is excluded from the first set of slices and the last slice is located closer to the feet of the subject than to the head of the subject. As an example, the last slice is located at a pelvic region including the pelvis of the subject. Main controller 14 searches for the last slice by executing a search algorithm. The search algorithm includes receiving from the user a seed point $S_2$ in one of the slices within the first set of slices. As an example, the seed point $S_2$ is the same as the seed point $S_1$. The seed point $S_2$ is located within the organ. As an example, the seed point $S_2$ is selected within a slice within the first set of slices that has a vertebra that includes a larger volume of bone than that of cartilage. As another example, the seed point $S_2$ is selected within a slice that includes the vertebra including bone but not cartilage. Effectively, in the example, the selection of the seed point $S_2$ within a slice that includes the vertebra including bone but not cartilage assures that a contour of the organ is sharp.

The search algorithm further includes finding an initial pixel of bone intensity in a column in which the seed point $S_2$ is located by starting at the seed point $S_2$ and traversing in an increasing Y direction, which is a direction opposite to the decreasing Y direction. The search algorithm also includes continuing to traverse in the increasing Y direction as long as intensity values of pixels correspond to bone. The search algorithm includes traversing the column to find a final pixel P below which intensity values of pixels in the column do not correspond to bone. The search algorithm further includes scanning a row in which the final pixel P is located for a pixel whose intensity value corresponds to bone. Pixels falling within a specific neighborhood of the final pixel P are scanned when scanning the row in which the final pixel P is located. If the scanning is successful, a pixel Q is found, where the pixel Q lies in the same row as the final pixel P and has an intensity value corresponding to bone. If the scanning is successful, a pixel in a succeeding row adjacent to the pixel Q is assigned to be the final pixel P, and main controller 14 repeats the scanning. If the scanning is unsuccessful, an $A_z$ (apex of a bone, for example, a bone within the vertebra) is defined as the final pixel P, where z is a slice number.

The search algorithm is repeated for all slices within the first set of slices by propagating an $A_z$ apex of a preceding slice, such as the slice on which the seed point $S_2$ is located, to a slice adjacent to the preceding slice. The $A_z$ apex is propagated to form a propagated point $P_1$. However, in repeating the search algorithm, the scanning is performed in one of the increasing Y direction and the decreasing Y direction depending on an intensity value of the propagated point $P_1$. If the propagated point $P_1$ hits a bone, the scanning is performed in the increasing Y direction. Otherwise, the scanning is performed in the decreasing Y direction.

In one embodiment, the last slice is selected in a manner similar to that described above for selecting the first slice by using at least one of the factors. As an example, a shape of the organ is used to determine an extent of the organ until the lower limit, such as the pelvic bones of the subject. As another example, the major change in the shape is at a location where a minimum of a concave curvature of the organ exists after a maximum of a convex curvature of the organ. Moreover, in an alternative embodiment, the manner, described above, for selecting the first slice by using at least one of the factors, such as a factor $F_1$ and receiving the seed point $S_1$ is used to select the last slice and the manner, described above, for selecting the last slice by using at least one of the factors, such as a factor $F_2$ and receiving the seed point $S_2$ is used to select the first slice.

Figure 3:
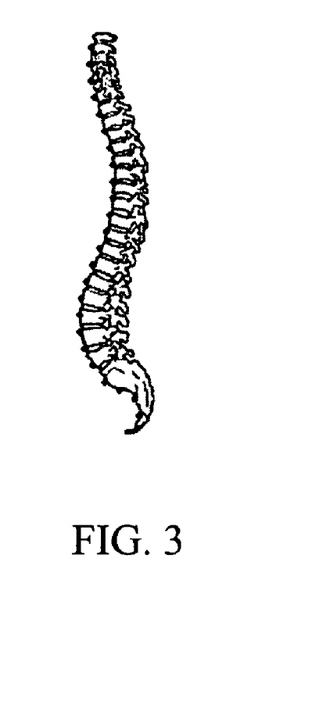
FIG. 3 shows a function that is generated by using the methods for segmenting an organ in a plurality of images and that maps a z coordinate of an $A_z$ apex of a vertebrae to a y coordinate of the $A_z$ apex.

The search algorithm yields a discrete function F: $Z \rightarrow Y$. shown in FIG. 3, which maps a z coordinate of an $A_z$ apex to its y coordinate. The function's domain is a set of slice indices. If the function oscillates substantially, it is smoothed by application of an interpolation, such as Bezier-interpolation, resulting in a quasi-continuous plot, denoted by G(z). A number of iterations of the interpolation is provided as a fixed parameter, such as, for example, thirty.

Figure 4:
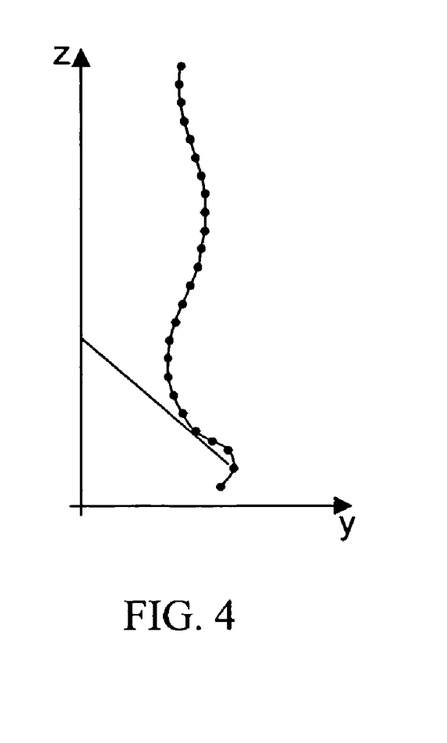
FIG. 4 shows a function $H:Z \rightarrow R$ that maps z to a tangent angle of $G'(z)$ and that is generated by implementing the methods for segmenting an organ in a plurality of images.

Main controller 14 calculates a derivative of G(z) with respect to z, and also computes a function H:$Z \rightarrow R$, which maps z to a tangent angle of G'(z). An example of the function H:$Z \rightarrow R$ is shown in FIG. 4.

Main controller 14 finds a slice having a tangent angle greater than a pre-specified Angle by starting at the slice including the seed point $S_2$, and going towards the feet of the subject. As an example, Angle ranges between zero degrees and forty-five degrees. As an example, a default value of the Angle is zero degrees. If such a slice having a tangent angle greater than the Angle exists, the slice is a last slice of the second set of slices. If no such slice exists, a slice obtained last in the first set of slices if the subject is scanned by imaging system 12 starting from head to toe is considered. The slice obtained last in the first set of slices has an index $z_1$. Angle is changed to a value, such as, 40 degrees, different than the default value. Main controller 14 locates a slice having a tangent angle less than the Angle by starting at index $z_1$, and going towards the head of the subject. If a slice having a tangent angle less than the Angle is found, the slice is located at a slice index $z_2$. Eventually, the last slice is defined as being located at a minimum of two slice indices: a z coordinate of the seed-point $S_2$ and $z_2$.

Main controller 14 obtains the second set of slices from the first set of slices by determining the initial slice and the last slice, and executes the active contour algorithm. The active contour algorithm determines the contour of the organ within the second set of slices. In the active contour algorithm, placement and shape of the contour minimizes an energy function, and the contour is one of many local minimas of the energy function. The energy function contains a linear combination of energies including internal energy, image energy, and constraint energy. Internal energy makes the contour smooth because it includes speeds of parameters along the contour and accelerations of the parameters along the contour. The speeds are related to elasticity of the contour and the accelerations are related to a curvature of the contour. The image energy corresponds to an image force, described below, and the constraint energy corresponds to a constraint force, described below.

Main controller 14 provides at least one of the following inputs to the active contour algorithm. 1) a slice or a stack of slices obtained from imaging system 12, 2) a standard deviation for a filter, such as a Gaussian smoothing filter, 3) a seed point, 4) an extent or slice range, e.g., the second set of slices, and 5) parameters having preset values based on which the organ (e.g., heart or spinal cord) is to be segmented. The parameters cannot be modified by the user in one embodiment. Alternatively, the parameters can be modified by the user. Moreover, in yet another alternative embodiment, the standard deviation may not be provided as an input. An output of the active contour algorithm is a series of closed curves having similar forms and positions on subsequent slices, where a closed curve is piecewise linear given by series of points on each slice giving a boundary of the organ that is segmented.

Goals of the active contour algorithm are as follows. 1) If a seed point is specified by the user in an interior region of the organ to be segmented, the active contour algorithm finds the same organ, regardless of where the seed point is selected within the interior. 2) The active contour algorithm performs a smoothing operation on the contour that separates the organ from background. 3) The contour stops at edges of the organ but not at image noise. 4) If the method is initialized on a slice that gives reliable initial segmentation, propagation of a seed point results in a reliable segmentation on consecutive slices. 5) The active contour algorithm considers previously available information, such as, for example, results of segmentation on nearby slices. 6) The active contour algorithm uses three dimensional (3D) information, for example edges on nearby slices, if available, for the segmentation. 7) The contour does not intersect itself. 8) The contour is allowed to expand or shrink. 9) The active contour algorithm provides a balance between smoothness of the contour and speed with which the active contour algorithm is executed. The lesser the number of points on the contour, the faster the speed of the active contour algorithm. The finer or more detailed the contour, the higher the number of points on the contour is used.

The contour is determined by determining multiple energies, such as the image energy and the constraint energy, and effects of the energy on points on the contour. The image energy is a negative of a gradient norm of intensity values on one of the slices, referred to as a first slice, in the second set of slices. Main controller 14 computes the gradient norm by computing a gradient of intensity values in both X and Y directions and calculating a norm of the gradient. Before computing the gradient norm, smoothing, such as, Gaussian smoothing and/or anisotropic diffusion, may be applied to the first slice to filter the slice from noise. In an alternative embodiment, the smoothing is applied after computing the gradient norm. In yet another alternative embodiment, the smoothing is not applied. The image energy is low near the organ in the first slice and high everywhere else. The image energy forces the contour to be attracted by edges of the organ.

Main controller 14 computes the constraint energy on the first slice by calculating a negative distance, which is a negative of a distance, from a point on the first slice. Main controller 14 computes the constraint energy on slices other than the first slice within the second set by calculating a distance from a given curve, such as a curve drawn by the user, on the other slice. The constraint energy is generated usually from interaction by the user or from some other information, not contained within data present in one of the slices of the second set of slices. For example, if the user picks a point $x_0$ inside the contour, the constraint energy is a distance or a negative of the distance of a point on the contour from $x_0$. The constraint energy forces the contour to be contracted toward or pushed away from $x_0$. As another example, the constraint energy is a distance of a point on the contour from a curve $v_0(s)$, which is an estimation of the contour. The estimation is provided by the user. An effect of the constraint energy is that the curve $v_0(s)$ will attract the contour. Main controller 14 computes the gradient norm of both the image energy and the constraint energy to obtain the image force and the constraint force. Main controller 14 also calculates a linear combination of the image force and the constraint force. It is noted that the image energy and the constraint energy are independent of the contour. Therefore, the image energy, the constraint energy, and their effects can be computed before starting an iteration, described below.

The contour is initialized as a geometrically-shaped object, such as a circle or an ellipse, around a seed point selected by the user on one of the slices of the second set of slices. Alternatively, the contour is initialized as the geometrically-shaped object around a propagated point on one of remaining slices of the second set of slices. Main controller 14 stores the geometrically-shaped object and the contour as a sequence of points, such as points 90, 92, 94, 96, 98, and 100, shown in FIG. 5. An edge 102 is located between points 90 and 92, an edge 104 is located between points 92 and 94, an edge 106 is located between points 94 and 96, an edge 108 is located between points 96 and 98, and an edge 110 is located between points 98 and 100. Main controller 14 stores the geometrically-shaped object and the contour in the computer-readable medium or in a mass storage device.

Figure 5:
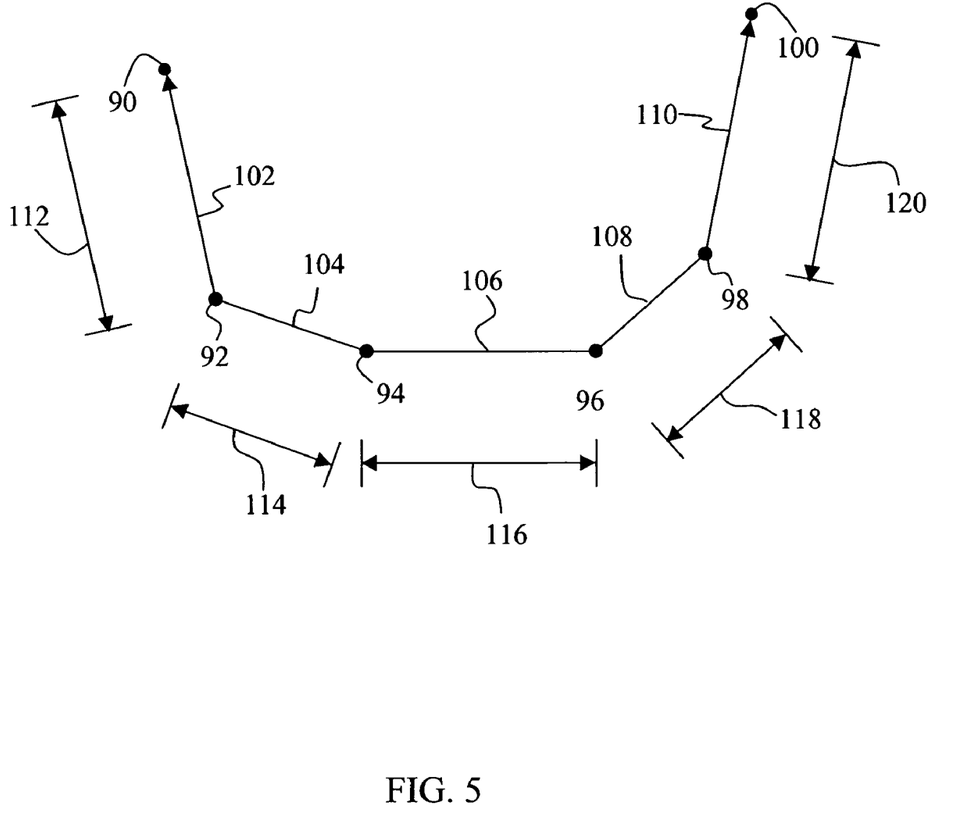
FIG. 5 shows an embodiment of a contour obtained by executing the methods for segmenting an organ in a plurality of images.

Main controller 14 executes the iteration by executing at least three cycles traversing each point of the contour. The three cycles include a first cycle, a second cycle, and a third cycle. In the first cycle, main controller 14 computes distances between adjacent coordinates of points, such as points 90, 92, 94, 96, 98, and 100, on the contour by calculating a difference between the coordinates. An edge of the contour is included between the adjacent coordinates. If the distance is larger than a maximal length $d_{max}$, main controller 14 splits the edge into two and increases a number of points on the contour. An example $d_{max}$ of is 3. Similarly, if the distance is smaller than a minimal length $d_{min}$, then main controller 14 removes the edge and decreases the number of points. An example $d_{min}$ of is 0.5. However, minimal digressions are ignored by main controller 14 and not adjusted. In an alternative embodiment, to make the contour smoother than that in a preceding iteration, main controller 14 splits edges of the contour and repeats the iteration. Main controller 14 also calculates an average µ of distances between all adjacent points on the contour. For example, an average of distances 112, 114, 116, 118, and 120 between adjacent points 90, 92, 94, 96, 98, and 100 is (112+114+116+118+120)/5. Alternatively, main controller 14 calculates an average µ of distances between points proximate to a current point. As an example, main controller 14 calculates an average (102+104+106+108)/4 of distances between points 90, 92, 94, 96, and 98 proximate to point 94, where point 94 is the current point. The maximal length $d_{max}$ and the minimal length $d_{min}$ are a percentage of the average µ of distances.

During the second cycle, main controller 14 computes the cosine of an angle between two edges, such as edges 104 and 106, adjacent to the current point. Main controller 14 computes the cosine by scalar multiplication of two vectors starting from the current point between the edges adjacent to the current point and dividing by lengths of the edges.

In the third cycle, main controller 14 determines a direction in which points on the contour are placed in the iteration. To determine the direction in which points on the contour are placed in the iteration, main controller 14 computes a linear combination of first, second, third, and fourth vectors.

Figure 6:
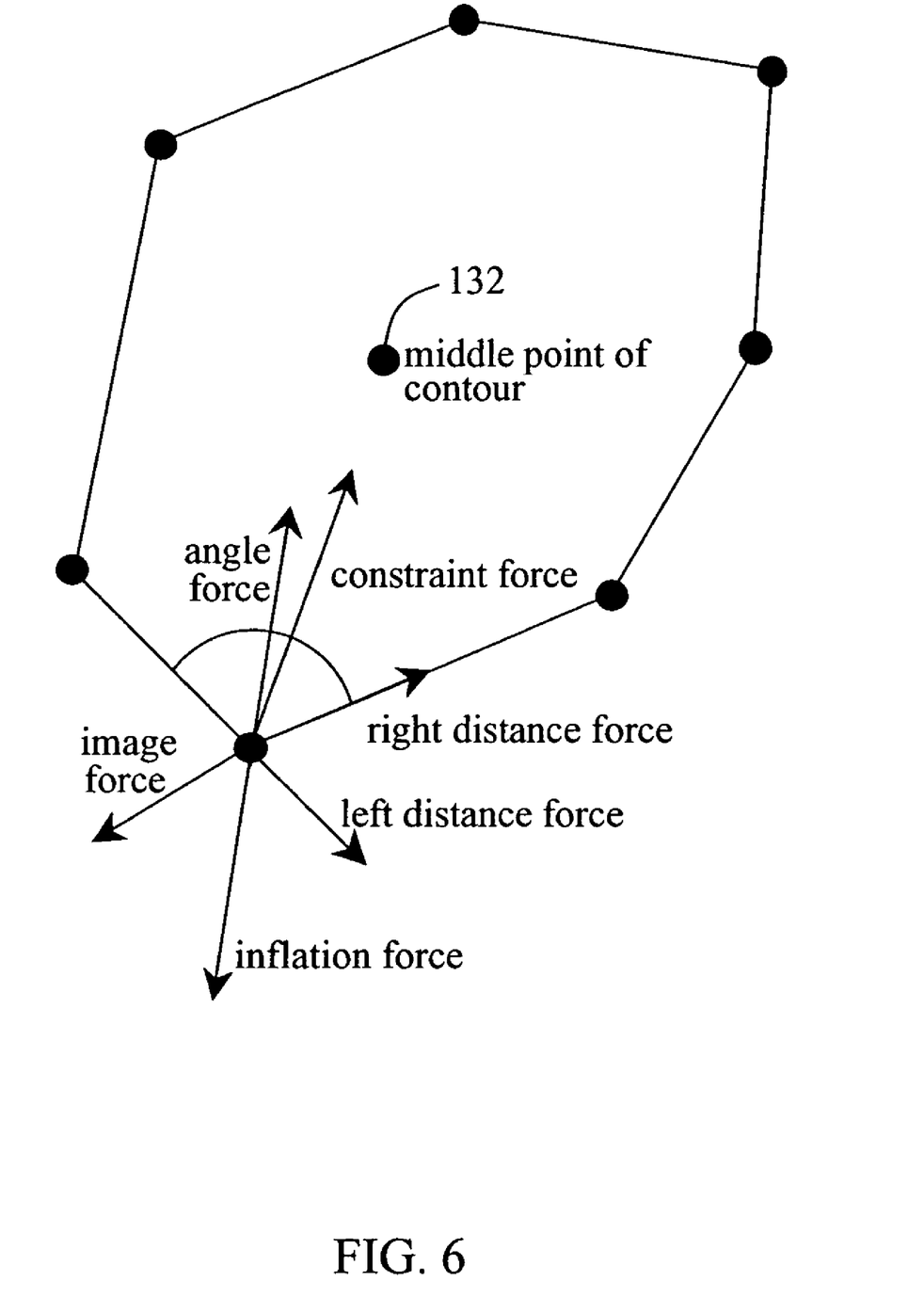
FIG. 6 shows an embodiment of various forces acting on a contour obtained by executing the methods for segmenting an organ in a plurality of images.
Figure 7:
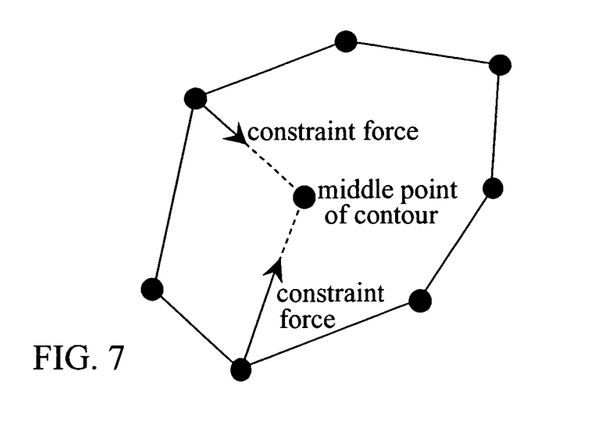
FIG. 7 shows an embodiment of a constraint force acting on a contour obtained by executing the methods for segmenting an organ in a plurality of images.

The first vector is obtained from an image force corresponding to the image energy and a constraint force corresponding to the constraint energy before the iteration. As an example, the first vector is the linear combination of the image force and the constraint force. Examples of constraint forces that are computed are shown in FIGS. 6 and 7 and an example of the image force that is computed is shown in FIG. 6.

The second vector, which is a distance force, is a vector pointing in a direction of a point, such as point 96 shown in FIG. 5, adjacent to the current point, with a size dependent on the average µ of distances and a on a distance from the point adjacent to the current point. Examples of the distance force include a left distance force and a right distance force. The left distance force is a force between the current point and a point that is adjacent to the current point, lies on the contour, and is located to the left of the current point. An example of the left distance force is shown in FIG. 6. The right distance force is a force between the current point and a point that is adjacent to the current point, lies on the contour, and is located to the right of the current point. An example of the right distance force is shown in FIG. 6.

Figure 8:
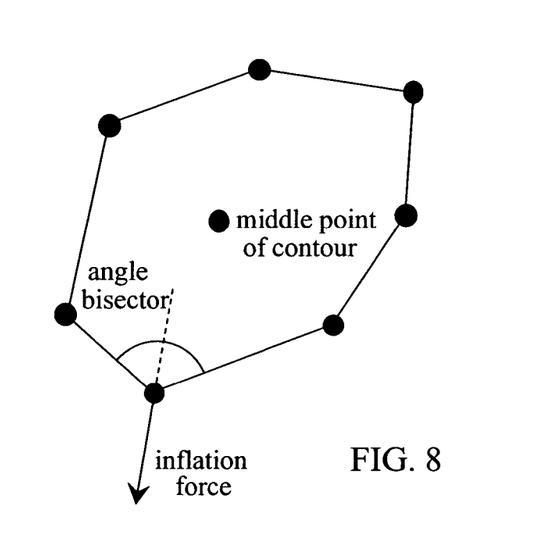
FIG. 8 shows an embodiment of a local inflation force acting on a contour obtained by executing the methods for segmenting an organ in a plurality of images.
Figure 9:
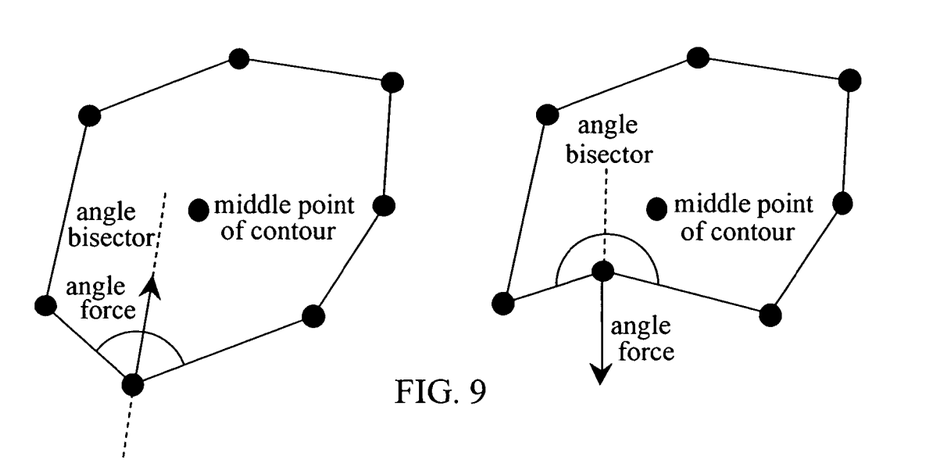
FIG. 9 shows embodiments of angle forces acting on contours obtained by executing the methods for segmenting an organ in a plurality of images.

The third vector, which is an angle force, is a vector pointing in a direction of a bisector of an angle between edges adjacent to the current point. Examples of bisectors are shown in FIGS. 8 and 9, and examples of angle forces are shown in FIG. 9. The angle force is used to smooth the contour. The size of the third vector depends on the angle. The angle force calculates a deviation of the angle from one hundred and eighty degrees. Examples of the angle force include a convex angle force and a concave angle force. The convex angle force is a force acting on a point on the contour if the angle is greater than one hundred and eighty degrees. The concave angle force is a force acting on a point on the contour if the angle is less than one hundred and eighty degrees.

The fourth vector, which is a local inflation force, is a vector pointing in a direction of the bisector and has a small constant size. The local inflation force expands the contour. When a point on the contour does not move and is stuck at a local minimum, the local inflation force pushes the point in a direction of the bisector outward with a small constant.

Main controller 14 repeats the iteration as long as points on the contour move substantially or alternatively, a maximum number of pre-specified iterations is reached. The contour is modified and developed by repeating the iteration.

While executing, the user, such as a programmer, manually or alternatively by executing a training process developed by the user, adjusts the image force, constraint force, local inflation force, angle force, and distance force based on various parameters. The image force, constraint force, local inflation force, angle force, and distance force are adjusted so that values and directions of the image force, constraint force, local inflation force, angle force, and distance force are proportional to each another. A goal of adjusting the image force, constraint force, local inflation force, angle force, and distance force is to reach equilibrium at points on the contour at which the forces are calculated. In achieving the preceding goal, a set of forces having approximately opposite directions are paired and a mutual balance is found between the set. Examples of the set include a set of the constraint force and the local inflation force, a set of the image force and the local inflation force, and a set of the image force and the constraint force. Moreover, in achieving the preceding goal, an overall balance is found among all sets of forces, where each set includes forces in approximately opposite directions.

The user adjusts the image force to attract the contour towards edges of the contour. As an example, the user adjusts the image force to have a magnitude of 3. The user adjusts the image force by multiplying a weight parameter to a negative gradient norm of intensity values on one of the slices in the second set of slices.

The user adjusts the constraint force to constrain size and shape of the contour. As an example, the user adjusts the constraint force to have a magnitude of 1.5. The user adjusts the constraint force by calculating a distance of the current point from a middle point, such as point 132 shown in FIG. 6, of the contour. The farther the current point from the middle point, a bigger constraint force has to draw back the current point. The constraint force points toward a middle of the contour and a size of the constraint force is a product of the distance and a weight parameter. The size of the constraint force depends on the local inflation force, and the constraint force and the local inflation force equalize each other on the contour.

The user adjusts the local inflation force by adjusting two parameters, minimum change and move. An example of minimum change is 0.1 and an example of move is 0.1. When a sum of all forces other than the local inflation force is smaller than the minimum change, a size of the local inflation force is move, otherwise it is zero.

The user adjusts the angle force by adjusting parameters $weight_1$ and $threshold_1$. As an example, if the angle force is the convex angle force, $weight_1$ is 0.2 and $threshold_1$ is 0.15. As another example, if the angle force is the concave angle force, $weight_1$ is 0.2 and $threshold_1$ is 0.01. When a product of the deviation from one hundred and eighty degrees and $weight_1$ is greater than $threshold_1$, a size of the angle force is $weight_1$. Otherwise the size of the angle force is 0. The angle force draws a point on the contour towards one hundred and eighty degrees in a direction of the bisector. However, minimal deviations from one hundred and eighty degrees are ignored by main controller 14 and not adjusted. The angle force may be adjusted based on a shape of the organ. As an example, if the organ is a spinal cord, the concave angle force is greater than the convex angle force because the spinal cord is a convex object.

Figure 10:
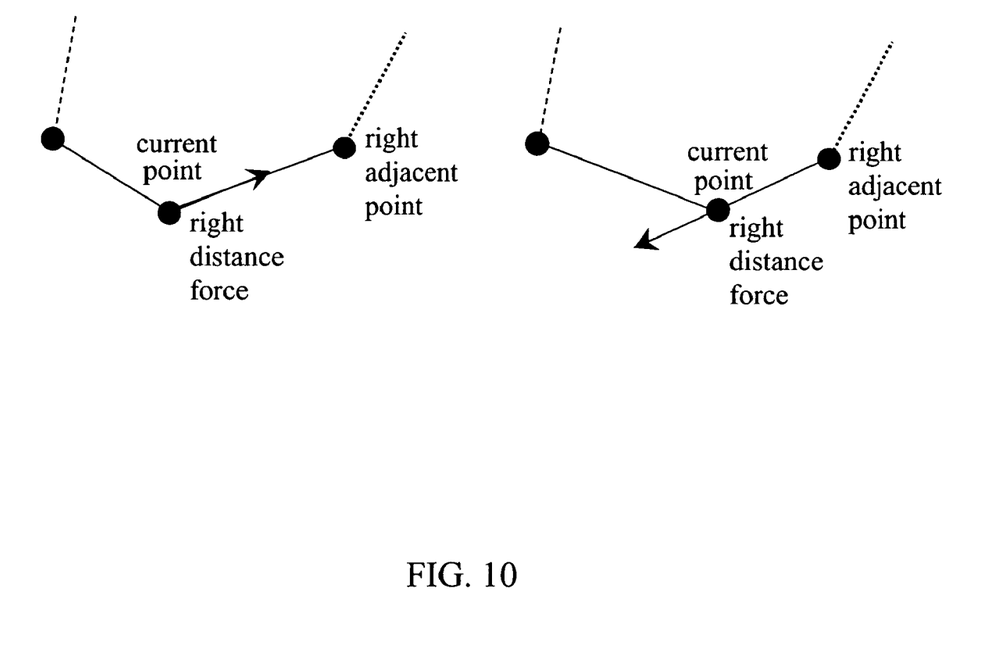
FIG. 10 shows embodiments of right distance forces acting on contours obtained by executing the methods for segmenting an organ in a plurality of images.

The user adjusts the distance force by computing a digression of the distance between points adjacent to the current point from the average $\mu$ of distances, and by adjusting parameters $weight_2$ and $threshold_2$. Examples of right distance forces that are being adjusted are shown in FIG. 10. In one embodiment, $threshold_2$ depends on a speed of movement of points on the contour. If the points move fast, $threshold_2$ is large, for example, 3-6 pixels. If the points move slow, $threshold_2$ is small, for example, 1-2 pixels. An example of $weight_2$ is 0 and $threshold_2$ is 0. When a product of the digression and $weight_2$ is greater than $threshold_2$, a size of the distance force is $weight_2$. Otherwise, the size of the distance force is zero. The distance force pulls the current point on the contour into a tentative middle position between points adjacent to the current point.

Main controller 14 segments the organ on a current slice by executing the active contour algorithm and automatically propagates, without intervention from the user, the seed point $S_2$ from the current slice within the second set of slices to a next slice within the second set of slices. The current slice is a slice on which segmentation of the organ precedes segmentation of the organ on the next slice. In an alternative embodiment, the user selects seed points in more than one slice within the second set of slices and the seed point $S_2$ is not automatically propagated. The propagation of the seed point $S_2$ generates a propagated point $P_2$. To propagate the seed point $S_2$, main controller 14 propagates a first centroid of the contour from the current slice to the next slice.

Main controller 14 confirms that the propagated point $P_2$ is within the organ on that slice. The confirmation is useful if the organ is small, such as a spinal cord, in diameter, and is curved. Main controller 14 confirms by determining whether a difference between intensity values of the seed point $S_2$ and the propagated point $P_2$ is below a threshold. The threshold depends on a variance of intensity values of the organ that is segmented on the current slice. If the difference is not below the threshold, a position of the propagated point $P_2$ is modified by extrapolation. Main controller 14 extrapolates by considering positions of the first centroid and a second centroid on a preceding slice on which segmentation of the organ precedes segmentation of the organ on the current slice. Main controller 14 determines a vector between the first and the second centroids, and moves the first centroid along the vector until it intersects the next slice. A point at which the first centroid intersects the next slice is the propagated point $P_2$. The organ is segmented as described above on the next slice.

Main controller 14 inflates the contour if after segmenting the organ, the organ is narrow. As an example, when performing Gaussian smoothing, as described above, is used, the contour shrinks and so main controller 14 inflates the contour. Main controller 14 inflates the contour by applying the local inflation force. Main controller 14 may dilate the contour after segmenting the organ. Alternatively, main controller 14 may not inflate or dilate the contour after segmenting the organ.

In an alternative embodiment, instead of applying the active contour algorithm, main controller 14 segments the organ from the second set of slices by executing the region growing algorithm. Goals of the region growing algorithm are as follows. 1) If a seed point is specified by the user in an interior region of the organ to be segmented, the region growing algorithm finds the same organ, regardless where the seed point is selected within the interior. 2) The contour stops at edges of the organ but not at image noise. 3) If the method is initialized on a slice that gives reliable initial segmentation, propagation of a seed point results in a reliable segmentation on consecutive slices. 4) The region growing algorithm considers previously available information, such as, for example, results of segmentation on nearby slices. 5) The region growing algorithm uses 3D information, for example edges on nearby slices, if available, for segmentation the organ.

Main controller 14 provides at least one of the following inputs to the region growing algorithm. 1) a slice or a stack of slices obtained by using imaging system 12, 2) a standard deviation for a filter, such as a Gaussian smoothing filter, 3) a seed point, 4) an extent or slice range, e.g., the second set of slices, and 5) constraints have preset values, depending on which organ is to be segmented. The constraints cannot be modified by the user in one embodiment. Alternatively, the constraints can be modified by the user. Moreover, in yet another alternative embodiment, the standard deviation may not be provided as an input. An output of the region growing algorithm is a map representing the organ with each slice in the second set of slices. The map assigns an integer for each pixel identifying the organ that is segmented and identifying a background.

Main controller 14 initiates the region growing algorithm by receiving from the user a selection of one of the slices within the second set of slices and that includes the organ, and by selecting a seed-point $S_3$ within the slice. As an example, the user selects one of the slices that lies within the second set of slices and on which the spinal cord is encapsulated by the vertebra. In the example, the selection improves chances of success of segmentation of the organ. The seed point $S_3$ is selected in a similar manner in which one of seed points $S_1$ and $S_2$ are selected. When the slice on which the seed point $S_3$ is located is specified, segmentation of the organ starts. Segmentation is initiated by the user. As an example, segmentation is initiated by the user when the user selects a button on a graphical user interface, a cathode ray tube, or a keyboard.

Main controller 14 segments the organ on the slice on which the seed point $S_3$ is located by starting from the seed-point $S_3$ as a label map and determining pixels that satisfy a condition. The condition is $$I_l \leq I \leq I_h \qquad (1)$$

where I is an intensity value of a pixel located on the slice on which the seed point $S_3$ is located. The pixel with intensity value I is also located within the organ that is segmented. $I_l$ and $I_h$ are pre-defined constants that depend on an intensity value of the seed point $S_3$. An example of $I_l$ is 20 and an example of $I_h$ is 60. Other examples of $I_l$ include intensity values that range between $I_s$-40 and $I_s$-60, where $I_s$ is the intensity value of the seed point $S_3$. Other examples of $I_h$ include intensity values that range between $I_s$-40 and $I_s$-60. Growing of a first region around the seed point $S_3$ by adding the pixel with intensity value I may be restricted to a window surrounding the seed point $S_3$. Examples of the window includes a square window and a rectangular window. Examples of the square window include a window of size p×q pixels, where each of p and q range from 150 to 180. Size of the window depends on a size of the organ and a resolution of an image on which the window is created. As an example, when the organ is a spinal cord, the growing is restricted to a square window of size 161×161 pixels about the seed point $S_3$. If segmentation of the organ exceeds boundaries of the organ, the user re-selects a seed point $S_4$ that is different from the seed point $S_3$ and the growing is initiated from the seed point $S_4$.

Main controller 14 segments the organ within the slice having the seed point $S_3$, and automatically propagates the seed point $S_3$ to one of the remaining slices other than the slice having the seed point $S_3$ in a manner similar to the propagation of the seed point $S_2$. In one embodiment, a seed point is propagated from an image of the elongated organ to another image of the elongated organ. Propagation of the seed point $S_3$ generates a propagated point $P_3$. Alternatively, instead of automatically propagation the seed point $S_3$, the user selects seed points in more than one slices within the second set of slices. Segmentation within the slice that includes the propagated point $P_3$ is restricted to the window of the same size as described above. Contrary to the growth of the first region, growing of a second region is initialized from a neighborhood, such as a 3×3 neighborhood, of pixels surrounding and including the propagated point $P_3$ to make the initialization robust against image noise and imaging artifacts.

At each iteration of growing the second region, the propagated point $P_3$ and the second region are provided. Moreover, at each iteration of growing the second region, a pixel b located at a boundary of the second region is provided. The pixel b is investigated for extension around the propagated point $P_3$. Furthermore, at each iteration of growing the second region, a neighboring pixel p that is proximate to the pixel b is provided. The pixel p is added to the second region if $$\alpha \frac{D}{M} + \beta \frac{d}{m} < T, \qquad (2)$$

where $\alpha$ and $\beta$ are weights and T is a pre-specified threshold. Parameter D is a difference between an intensity value of the pixel p and an intensity value of the propagated point $P_3$. Parameter d is a difference between the intensity value of the pixel p and an intensity value of the pixel b. Parameter M is a local feature and is a maximum of absolute values of differences in intensity values between each pixel in the first region and the seed point $S_3$. Parameter m is a global feature and is a maximum of absolute values of differences in intensity values between each pair of neighboring pixels p1 and p2 within the first region. The parameters M and m describe homogeneity of the first region. By including parameters M and m, statistical features of the slice that includes the seed point $S_3$ are incorporated into one of remaining slices of the second set of slices to which the seed point $S_3$ is propagated. The inclusion of the statistical features makes cross-sections of one of the remaining slices statistically similar to that of the slice that includes the seed point $S_3$.

Main controller 14 applies various constraints, such as size constraints, shape constraints, and morphological constraints, to the second region to detect whether the second region exceeds the organ and to embed prior knowledge into the second region.

In applying the size constraints, main controller 14 determines whether size of the second region is substantially different than that of the first region. As an example, main controller 14 determines whether $$T_a = A \cdot \left(1 + \frac{1}{A_{thr}}\right) \qquad (3)$$

where $T_a$ is a parameter, A denotes an area of the first region, and $A_{thr}$ is a constant. If the area A is greater than $T_a$, the second region is rejected and growth on one of the remaining slices that include the propagated point $P_3$ is restarted.

Before restarting the growth, main controller 14 derives a distance map from the slice that includes the seed point $S_3$ and combines weights with the distance map. Every element $D_{ij}$ of the distance map shows a distance of a corresponding pixel on the slice with the seed point $S_3$ from a nearest pixel within the first region. For example, $D_{ij}$ elements corresponding to the first region will be zeros. The distance map is calculated in the same window, as described above, to which the growth of the first and second regions is constrained. Every element $D_{ij}$ is weighted by multiplication with a scalar. The weighting yields a weighted distance map D' that includes elements $D_{ij}'$. As an example, $D_{ij}'=D_{ij}\cdot 25$, if $D_{ij}<3$, $D_{ij}'=D_{ij}\cdot 50$, if $15 \geq D_{ij} \geq 3$, and $D_{ij}'=0$ if $D_{ij} \geq 15$ \hfill (4)

To compensate for differences between slices, main controller 14 may perform a registration, for example, with two degrees of freedom, between the slice that includes the seed point $S_3$ and the slice that includes the propagated point $P_3$. The registration provides a transformation which maps the slice that includes the seed point $S_3$ onto the slice that includes the propagated point $P_3$. The weighted distance map is transformed by the transformation and is added to intensity values of the slice that includes the propagated point $P_3$ to generate a combined image. Growth is restarted from the propagated point $P_3$ on the combined image.

In applying the shape constraints, main controller 14 determines whether the organ that is being segmented has pre-defined shape characteristics and constrains growth of the second region by applying the pre-defined shape characteristics. For example, the spinal cord has a tubular structure and in each slice it appears to be approximately circular in shape. In the example, a circular mask of an approximate size of the spinal cord is applied to the second region. If the second region is found to exceed the pre-defined shape characteristics, portions of the second region that exceed the characteristics are removed. Alternatively, to conform to the pre-defined shape characteristics, portions are added to the second region.

In applying the morphological constraints, main controller 14 applies convexity and connectivity constraints. For example, the main controller 14 restricts growth of the second region to an hv-convex shape in which pixels within the second region are located continuously both row-wise and column-wise. In an alternative embodiment, the various constraints, such as size, shape, and morphological constraints, are not applied to the second region.

Moreover, main controller 14 performs the following operations on the second region. Main controller 14 erodes the second region at least once, for example, twice, using a d×e kernel. An example of the d×e kernel is a three by three kernel. Main controller 14 dilates the second region at least once, for example, twice, using the d×e kernel. Main controller 14 determines a 4-connected component including the propagated point $P_3$ as a final result on the slice that includes the propagated point $P_3$.

It is noted that if slices of an image have a thickness, the herein described methods for segmenting an organ within images can be applied to voxels instead of pixels. For example, instead of using pixel p as described above, a voxel v is used and instead of using pixel b as described above, a voxel b is used.

Technical effects of the herein described methods for segmenting an organ within images include reducing chances of "leaking out". Typical methods are prone to "leaking out" if edges of the organ are not well-defined in data of a slice of an image. The "leaking out" has at least two disadvantages. 1) Segmentation results in a slice are not trustworthy and require the user's interaction for confirmation or correction. 2) One slice in which the "leaking out" has occurred ruins subsequent slices because segmentation is done slice-by-slice and segmentation on subsequent slices are initialized by utilizing results on preceding slices. The herein described methods reduce the chances of "leaking out" by restarting the growth when main controller 14 determines that size of the second region is substantially different than that of the first region. Furthermore, the herein described methods reduce the chances of "leaking out" by implementing the various constraints described above. Additional technical effects of the herein described methods include reducing sensitivity to image noise.

While the invention has been described in terms of various specific embodiments, those skilled in the art will recognize that the invention can be practiced with modification within the spirit and scope of the claims.

What is claimed is:

1. A system for segmenting an organ in a plurality of images, said system comprising:
   an imaging system configured to generate a first plurality of slices showing images of a subject having the organ; and
   a controller configured to:
   determine a second plurality of slices within the first plurality of slices, wherein the second plurality of slices includes the organ and a remaining set of slices within the first plurality of slices excludes the organ;
   segment the organ from the second plurality of slices without a need to segment the remaining set within the first plurality of slices; and
   determine a contour of the organ within the second plurality of slices by determining effects of multiple forces on the contour.

2. A system in accordance with claim 1 wherein to determine a contour of the organ within the second plurality of slices said controller configured to change the contour based on at least one of:
   a distance between adjacent points on the contour; and
   a combination of forces acting on various points on the contour.

3. A system in accordance with claim 1 wherein to determine a contour of the organ within the second plurality of slices said controller configured to perform one of:
   inflation of the contour; and dilation of the contour.

4. A system in accordance with claim 1 wherein to segment the organ from the second set of slices said controller is configured to perform at least one of:
   initialize a contour of the organ by drawing a geometrically-shaped object around a seed point on a first slice within the second plurality of slices; and
   initialize the contour by drawing a geometrically-shaped object around a propagated point on one of remaining slices within the second plurality of slices.

5. A system in accordance with claim 4 wherein the seed point is selected by a user.

6. A system for segmenting an organ in a plurality of images, said system comprising:
   an imaging system configured to generate a first set of slices showing images of a subject having the organ; and
   a controller configured to:
   determine a second set of slices within the first set, wherein the second set of slices includes the organ and a remaining set of slices within the first set of slices excludes the organ; and segment the organ from the second set of slices, wherein to segment the organ from the second set of slices said controller is configured to perform at least one of:
  initialize a contour of the organ by drawing a geometrically-shaped object around a seed point on a first slice within the second set of slices; and
  initialize the contour by drawing a geometrically-shaped object around a propagated point on one of remaining slices within the second set of slices, wherein to segment the organ from the second set of slices said controller is configured to automatically propagate, without user intervention, the seed point from the first slice to one of the remaining slices.

7. A system for segmenting an organ in a plurality of images, said system comprising:
  an imaging system configured to generate a first set of slices showing images of a subject having the organ; and
  a controller configured to:
    determine a second set of slices within the first set, wherein the second set of slices includes the organ and a remaining set of slices within the first set of slices excludes the organ; and
    segment the organ from the second set of slices, wherein to segment the organ from the second set of slices said controller is configured to perform at least one of:
      initialize a contour of the organ by drawing a geometrically-shaped object around a seed point on a first slice within the second set of slices; and
      initialize the contour by drawing a geometrically-shaped object around a propagated point on one of remaining slices within the second set of slices, wherein said controller is configured to automatically propagate the seed point from the first slice to one of the remaining slices by propagating a centroid of a region enclosed by the contour from the first slice to the one of the remaining slices.

8. A system for segmenting an organ in a plurality of images, said system comprising:
  an imaging system configured to generate a first set of slices showing images of a subject having the organ; and
  a controller configured to:
    determine a second set of slices within the first set, wherein the second set of slices includes the organ and a remaining set of slices within the first set of slices excludes the organ; and
    segment the organ from the second set of slices, wherein to segment the organ from the second set of slices said controller is configured to perform at least one of:
      initialize a contour of the organ by drawing a geometrically-shaped object around a seed point on a first slice within the second set of slices; and
      initialize the contour by drawing a geometrically-shaped object around a propagated point on one of remaining slices within the second set of slices, wherein said controller is configured to determine whether the propagated point is located within the organ.

9. A system in accordance with claim 8 wherein said controller is configured to modify a position of the propagated point if the propagated point is not within the organ.

10. A system in accordance with claim 1 wherein said imaging system is a computed tomography (CT) system.

11. A system in accordance with claim 1 wherein to segment the organ from the second plurality of slices said controller configured to receive from a user a selection of a first slice within the second plurality of slices and a seed point within the first slice.

12. A system for segmenting an organ in a plurality of images, said system comprising:
  an imaging system configured to generate a first set of slices showing images of a subject having the organ; and
  a controller configured to:
    determine a second set of slices within the first set, wherein the second set of slices includes the organ and a remaining set of slices within the first set of slices excludes the organ; and
    segment the organ from the second set of slices, wherein to segment the organ from the second plurality of slices said controller configured to receive from a user a selection of a first slice within the second plurality of slices and a seed point within the first slice, wherein to segment the organ from the second set of slices said controller configured to:
      generate a window around the seed point within the first slice; and
      grow a first region within the window.

13. A system in accordance with claim 12 wherein to grow the first region within the window said controller configured to add a pixel to the first region if intensity of the pixel is above a threshold.

14. A system in accordance with claim 12 wherein to segment the organ from the second set of slices said controller configured to receive from the user a reselection of another seed point if the first region exceeds boundaries of the organ.

15. A system in accordance with claim 12 wherein to segment the organ from the second set of slices said controller configured to propagate the seed point from the first slice to one of remaining slices within the second set of slices.

16. A system in accordance with claim 15 wherein a propagated point is generated by propagating the seed point from the first slice to one of the remaining slices within the second set of slices, and to segment the organ from the second set of slices said controller configured to initialize growth of a second region from a neighborhood of the propagated point.

17. A system in accordance with claim 16 wherein to segment the organ from the second set of slices said controller configured to grow the second region by determining whether $$\alpha \frac{D}{M} + \beta \frac{d}{m} < T,$$

wherein α and β are weights, T is a pre-specified threshold, D is a difference between intensity values of the propagated point and a first pixel located in a neighborhood of a second pixel that is located at a boundary of the second region, d is a difference between intensity values of the first and second pixels, M is a maximum value of a plurality of absolute values of differences between intensity values of the seed point and each pixel within the first region, and m is a maximum value of a plurality of absolute values of differences between each pair of neighboring pixels within the first region.

18. A system in accordance with claim 16 wherein to segment the organ from the second set of slices said controller configured to determine whether a size of the second region is similar to a size of the first region.

19. A system in accordance with claim 16 wherein to segment the organ from the second set of slices said controller configured to:
  map the first slice to the one of the remaining slices;
  calculate a distance map from the first slice;
  weigh the distance map to generate a weighted distance map;
  add the weighted distance map to intensity values of the one of the remaining slices; and
  restart growth of the second region.

20. A system in accordance with claim 16 wherein to segment the organ from the second set of slices said controller configured to perform at least one of:
  remove parts of the second region based on a pre-defined shape of the organ;
  add parts to the second region based on the pre-defined shape of the organ;
  erode the second region; and
  dilate the second region.

21. A method of segmenting an organ in a plurality of images, said system comprising:
  generating a first set of slices showing images of a subject having the organ;
  determine a second set of slices within the first set, wherein the second set of slices includes the organ and a remaining set of slices within the first set of slices excludes the organ; and
  segmenting the organ from the second set of slices by at least one of;
  initializing a contour of the organ by drawing a geometrically-shaped object around a seed point on a first slice within the second set of slices; and
  initialize the contour by drawing a geometrically-shaped object around a propagated point on one of remaining slices within the second set of slices, wherein to segment the organ from the second set of slices said controller is configured to automatically propagate, without user intervention, the seed point from the first slice to one of the remaining slices.

22. A method for segmenting an organ, said method comprising:
  generating, using an imaging system, a first plurality of slices showing images of a subject having the organ;
  determine a second plurality of slices within the first plurality of slices, wherein the second plurality of slices includes the organ and a remaining set of slices within the first plurality of slices excludes the organ;
  segmenting the organ from the second plurality of slices without a need to segment the remaining set within the first plurality of slices; and
  determine a contour of the organ within the second plurality of slices by determining effects of multiple forces on the contour.

23. A method for segmenting an organ in a plurality of images, said method comprising:
  generating, a first set of slice showing images of a subject having the organ;
  determine a second set of slices within the first set, wherein the second set of slices includes the organ and a remaining set of slices within the first set of slices excludes the organ; and
  segmenting the organ from the second set of slices, wherein to segment the organ from the second set of slices said controller is configured to perform at least one of:
  initializing a contour of the organ by drawing a geometrically-shaped object around a seed point on a first slice within the second set of slices; and
  initializing a contour by drawing a geometrically-shaped object around a propagated point on one of remaining slices within the second set of slices, wherein said controller is configured to automatically propagate the seed point from the first slice to one of the remaining slices by propagating a centroid of a region enclosed by the contour from the first slice to the one of the remaining slices.

24. A method of segmenting an organ in a plurality of images, said method comprising:
  generating a first set of slices showing images of a subject having the organ;
  determining a second set of slices within the first set, wherein the second set of slices includes the organ and a remaining set of slices within the first set of slices excludes the organ; and
  segment the organ from the second set of slices by at least one of:
  initializing a contour of the organ by drawing a geometrically-shaped object around a seed point on a first slice within the second set of slices; and
  initializing the contour by drawing a geometrically-shaped object around a propagated point on one of remaining slices within the second set of slices, wherein said controller is configured to determine whether the propagated point is located within the organ.

25. A method of segmenting an organ in a plurality of images using an imaging system, said system comprising:
  generating a first set of slices showing images of a subject having the organ;
  determining a second set of slices within the first set, wherein the second set of slices includes the organ and a remaining set of slices within the first set of slices excludes the organ; and
  segmenting the organ from the second set of slices by;
  receiving from a user a selection of a first slice within the second plurality of slices and a seed point within the first slice;
  generating a window around the seed point within the first slice; and
  growing a first region within the window.

* * * * *